United States Patent Office 2,913,442
Patented Nov. 17, 1959

2,913,442

PROCESS FOR THE POLYMERIZATION OF PROPYLENE

Albert S. Matlack, Wilmington, Del., assignor to Hercules Powder Company, Wilmington, Del., a corporation of Delaware No Drawing. Application May 27, 1957
Serial No. 661,571

4 Claims. (Cl. 260—93.7)

This invention relates to the polymerization of propylene under relatively mild conditions of pressure and temperature and, more particularly, to an entirely new type of catalyst system for the polymerization of propylene.

In accordance with this invention it has most unexpectedly been found that propylene may be polymerized at relatively mild temperatures and pressures by contacting propylene with a hydride of one of the metals of group IV-B of the periodic table, i.e., titanium, zirconium or hafnium, in the presence of a hydrogen halide. Both a high molecular weight, crystalline polypropylene and an amorphous polypropylene may be prepared by this means.

The metal hydride that is used as the catalyst in accordance with this invention may be preformed or formed in situ by the reaction of the metal with hydrogen. When a preformed metal hydride is used, it preferably is in a finely divided state or is reduced to such a state while in contact with the propylene. Thus, for example, zirconium hydride may be added to the polymerization system as a finely divided solid such as is obtained by ball milling or the polymerization may be carried out in a ball mill while the hydride is milled. Preferably the zirconium hydride or other group IV-B metal hydride will have an average particle size varying from about 1 micron or less to about 100 microns and more preferably from about 1 micron to about 20 microns. A particularly effective method of carrying out the process in accordance with this invention is to ball mill the metal hydride in the presence of the propylene and the hydrogen halide, either with or without a diluent. By so doing, a fresh surface of the metal hydride catalyst is continually contacted with the propylene being polymerized. A polymerization so started may be transferred to another vessel provided with adequate agitation such as with a high shear agitator.

As will be apparent from the above discussion, any amount of the group IV-B metal hydride in combination with a hydrogen halide may be used for the polymerization from a minor catalytic amount, as for example, the small amount that is present on the surface of the metal when the metal hydride is formed in situ, up to a large excess. In the case where a preformed metal hydride is used, the amount generally added will be from about 0.1% to about 50% and preferably from about 1% to about 20%, based on the propylene.

As already pointed out above, a combination of the metal hydride with a hydrogen halide is required to bring about the polymerization of propylene in accordance with this invention. Neither the metal hydride nor the hydrogen halide alone is effective as a catalyst for the polymerization of propylene. However, when a catylatic amount of a hydrogen halide such as hydrogen chloride, hydrogen bromide, hydrogen fluoride, or hydrogen iodide, is added, the polymerization readily takes place. The amount of hydrogen halide added may very from a minor catalytic amount to a large excess, but generally is from about 0.05% to about 5%, based on the propylene.

The polymerization of propylene in accordance with this invention may be carried out in a wide variety of ways. It may be carried out in the presence or absence of an inert organic diluent as reaction medium. Generally, a diluent is used because it simplifies the isolation of the polymer at the end of the polymerization reaction. Any inert liquid organic diluent may be used, as for example, aliphatic hydrocarbons such as hexane, heptane, etc., cycloaliphatic hydrocarbons such as cyclohexane or aromatic hydrocarbons such as benzene, toluene, xylene, etc., or any mixture of such hydrocarbons, halogenated hydrocarbons such as methylene chloride, ethylene chloride, chloroform, carbon tetrachloride, chlorobenzene, etc.

The temperature and pressure used for the polymerization process may be varied over a wide range and will largely depend upon the method by which the propylene is contacted with the metal hydride and hydrogen halide. In general, the polymerization will be carried out at room temperature or slightly above, but any temperature within the range of from about $-80°$ C. to about $200°$ C. may be used, preferably from about $0°$ C. to about $100°$ C., and more preferably from about $20°$ C. to about $60°$ C. In the same way, while atmospheric pressure or a pressure of only a few pounds may be used, the polymerization may be carried out over a wide range of pressures, but higher pressures do not appreciably alter the course of polymerization and, hence, are not required. In general, it is desirable to operate under anhydrous and anaerobic conditions.

The following example will demonstrate the process of polymerizing propylene in accordance with this invention. The molecular weight of the polymers produced is indicated by the Reduced Specific Viscosity (RSV) given for each. By the term "Reduced Specific Viscosity" is meant the $\eta_{sp}/c$. determined on an 0.1% solution of the polymer in decalin, containing 0.1 g. of the polymer per 100 ml. of solution at $135°$ C. All parts and percentages are by weight.

*Example*

In this example the polymerization was carried out in a cylindrical vibratory ball mill which was constructed of stainless steel (analysis: carbon—0.008% max.; Cr—18.00–20.00%; Ni—8.80–10.00%; Mn—2.00% max.) and outfitted with a gas inlet tube and a main opening. The mill was 80% full of 0.5 inch stainless steel balls.

The mill, previously dried for 4 hours at $120°$ C., was charged with 70 parts of n-heptane which had been dried over sodium and 2.0 parts of zirconium hydride. The mill was then capped, twice filled with dry nitrogen and evacuated, 0.16 part of hydrogen chloride was added, and propylene was injected to a pressure of 50 p.s.i.g. After 16 hours of milling at room temperature, the pressure had dropped to 2.5 p.s.i.g. The polymer slurry was then removed from the mill and the heptane-insoluble polypropylene was separated by centrifugation. It was purified by leaching with a 50:50 mixture of n-butanol and 48% aqueous hydrogen fluoride, separated by filtration, washed free of acid with water and ethanol and then dried overnight in vacuo at $80°$ C. The heptane-soluble polymer was obtained from the supernatant from the above centrifugation by evaporation of the solvent after which it was purified and dried.

The heptane-insoluble polymer amounted to 37% of the total polypropylene isolated and was shown to be highly crystalline by X-ray analysis. The melting point, i.e., the temperature at which the birefringence due to crystallinity disappears, was 160° C. and the polymer had an RSV of 4.9.

The heptane-soluble polymer amounted to 67% of the total polypropylene and had an RSV of 0.7.

When the above example was repeated except that no hydrogen chloride was added to the polymerization reaction mixture, there was no drop in pressure after 16 hours of milling at room temperature and no polymer was formed.

The periodic chart used in this specification and appended claims for designating the groups and subgroups of the periodic table is that given in the "Handbook of Chemistry and Physics" published by Chemical Rubber Publishing Company, Cleveland, Ohio, on pages 392–3 of the 36th edition. Thus, the metals designated as group IV–B are those that occur in the left-hand side of Group IV in the Mendeleev form of the periodic table (see Deming, "General Chemistry," sixth edition, 1952, John Wiley & Sons, Inc., New York).

What I claim and desire to protect by Letters Patent is:

1. The process of polymerizing propylene which comprises contacting propylene at a temperature of from about −80° C. to about 200° C. with a catalyst consisting essentially of a hydride of a group IV–B metal in combination with a hydrogen halide, said metal hydride having a particle size of from about 1 micron to about 100 microns and being present in an amount of from about 1% to about 20% by weight based on the propylene and said hydrogen halide being present in an amount of from about 0.05% to about 5% by weight based on the propylene.

2. The process of claim 1 wherein the metal hydride is zirconium hydride.

3. The process of claim 2 wherein the hydrogen halide is hydrogen chloride.

4. The process of polymerizing propylene which comprises ball milling at a temperature of from about −80° C. to 200° C. a mixture of propylene with a catalyst consisting essentially of zirconium hydride having a particle size of from about 1 micron to about 100 microns in combination with hydrogen chloride, said zirconium hydride being present in an amount of from about 1% to about 20% by weight of the propylene and said hydrogen chloride being present in an amount of from about 0.05% to about 5% by weight of the propylene.

References Cited in the file of this patent

UNITED STATES PATENTS

| | | |
|---|---|---|
| 2,461,951 | Linn | June 10, 1947 |
| 2,685,575 | Heiligmann et al. | Aug. 3, 1954 |
| 2,725,374 | Mosher | Nov. 29, 1955 |
| 2,846,427 | Findlay | Aug. 5, 1958 |

FOREIGN PATENTS

| | | |
|---|---|---|
| 538,782 | Belgium | Dec. 6, 1955 |
| 1,135,599 | France | Dec. 17, 1956 |

OTHER REFERENCES

"An Introduction to the Chemistry of the Hydrides" (Hurd), published by Wiley and Sons, August 25, 1952.